United States Patent

Siwko

[15] 3,706,846

[45] Dec. 19, 1972

[54] TELEVISION RECEIVER INTERMEDIATE FREQUENCY AMPLIFIER CIRCUITRY

[72] Inventor: Karol Siwko, Batavia, N.Y.

[73] Assignee: GTE Sylvania Incorporated

[22] Filed: Dec. 7, 1970

[21] Appl. No.: 95,485

[52] U.S. Cl. ....................178/7.3, 178/5.8 R, 325/319

[51] Int. Cl. ................................................H04n 5/48

[58] Field of Search......178/7.3 DC, 5.8; 330/31, 29, 330/21; 325/487, 490, 485, 318, 319

[56] References Cited

UNITED STATES PATENTS

| | | | |
|---|---|---|---|
| 3,613,008 | 10/1971 | Jabbar | 325/490 |
| 3,495,031 | 2/1970 | Poppa | 175/5.8 R |
| 2,704,792 | 3/1955 | Eberhard et al. | 330/31 |
| 3,025,343 | 3/1962 | Waring | 178/5.8 R |

*Primary Examiner*—Robert L. Griffin
*Assistant Examiner*—Donald E. Stout
*Attorney*—Norman J. O'Malley, Robert E. Walrath and Thomas H. Buffton

[57] ABSTRACT

An intermediate frequency amplifier, utilizing a common base transistor amplifier, which changes the intermediate frequency response with gain to improve the weak signal (maximum gain) performance of a television receiver is disclosed. Series and/or parallel resonant circuits are damped by the input impedance of the transistor to increase or decrease the Q of the circuit response.

13 Claims, 8 Drawing Figures

INVENTOR.
KAROL SIWKO

BY

Robert E. Walrath
ATTORNEY

TELEVISION RECEIVER INTERMEDIATE FREQUENCY AMPLIFIER CIRCUITRY

CROSS-REFERENCE TO RELATED APPLICATION

A co-pending application of Karol Siwko, Ser. No. 95,484, filed on the same date as this application and assigned to the same assignee as this application, discloses a bandpass amplifier related to the structure disclosed in this application.

BACKGROUND OF THE INVENTION

This invention relates to optimizing the weak or fringe signal performance of television receivers. In most television receivers an automatic gain control (AGC) bias signal is developed to increase the gain of one or more stages in the intermediate frequency (IF) amplifier and/or radio frequency (RF) amplifier when the received signal is weak. One type of AGC, known as reverse bias AGC, is disclosed in a co-pending application of Karol Siwko and Joseph E. Thomas, Ser. No. 729,767, filed May 16, 1968, now U.S. Pat. No. 3,549,802 and assigned to the same assignee as the present invention. In the circuit disclosed in the referenced application, a strong received signal causes the AGC bias to reduce the gain of the IF amplifier.

IF amplifiers which change the IF response with gain to optimize weak signal performance are also known in the prior art particularly in tube amplifiers. In transistor IF amplifiers, however, attempts to shape the IF response with gain have generally produced poor results because the design parameters of transistors are critical. Furthermore, many transistor parameters vary substantially between devices of the same type thereby rendering some prior art designs impractical or difficult to use. In other prior art designs, the television receiver is detuned, i.e., the signal is shifted with respect to the IF response, when weak signals are received so that the picture-to-sound carrier ratio is altered from optimum and the various circuit components do not perform their intended function.

OBJECTS AND SUMMARY OF THE INVENTION

Accordingly, it is an object of this invention to provide an IF amplifier with improved weak signal performance.

It is another object of this invention to peak the IF amplifier amplitude response at the video carrier frequency when the received signal is weak.

It is another object of this invention to reduce the chrominance carrier amplitude relative to the video carrier amplitude when the received signal is weak.

It is another object of this invention to relatively increase the IF amplifier amplitude response at the audio carrier frequency when the received signal is weak.

It is another object of this invention to decrease the IF amplifier amplitude response between the audio and video carrier frequencies to reduce sound intermodulation noise when the received signal is weak.

It is another object of this invention to increase the IF amplifier amplitude response at the video carrier frequency when the received signal is weak without detuning the receiver.

The above objects and other objects and advantages of this invention are achieved in a television receiver having an intermediate frequency amplifier wherein an amplifier stage has a resonant or tuned circuit and a transistor means connected or biased in a common base configuration with the input impedance of the transistor means damping the resonant circuit. An automatic gain control circuit connected to the amplifier stage varies the input impedance of the transistor means in accordance with an automatic gain control bias signal to vary the frequency response bandwidth of the amplifier stage.

DETAILED DESCRIPTION OF THE INVENTION

For a better understanding of the present invention, together with other and further objects, advantages, and capabilities thereof, reference is made to the following disclosure and appended claims in connection with the above-described drawings.

Figures 1, 4:
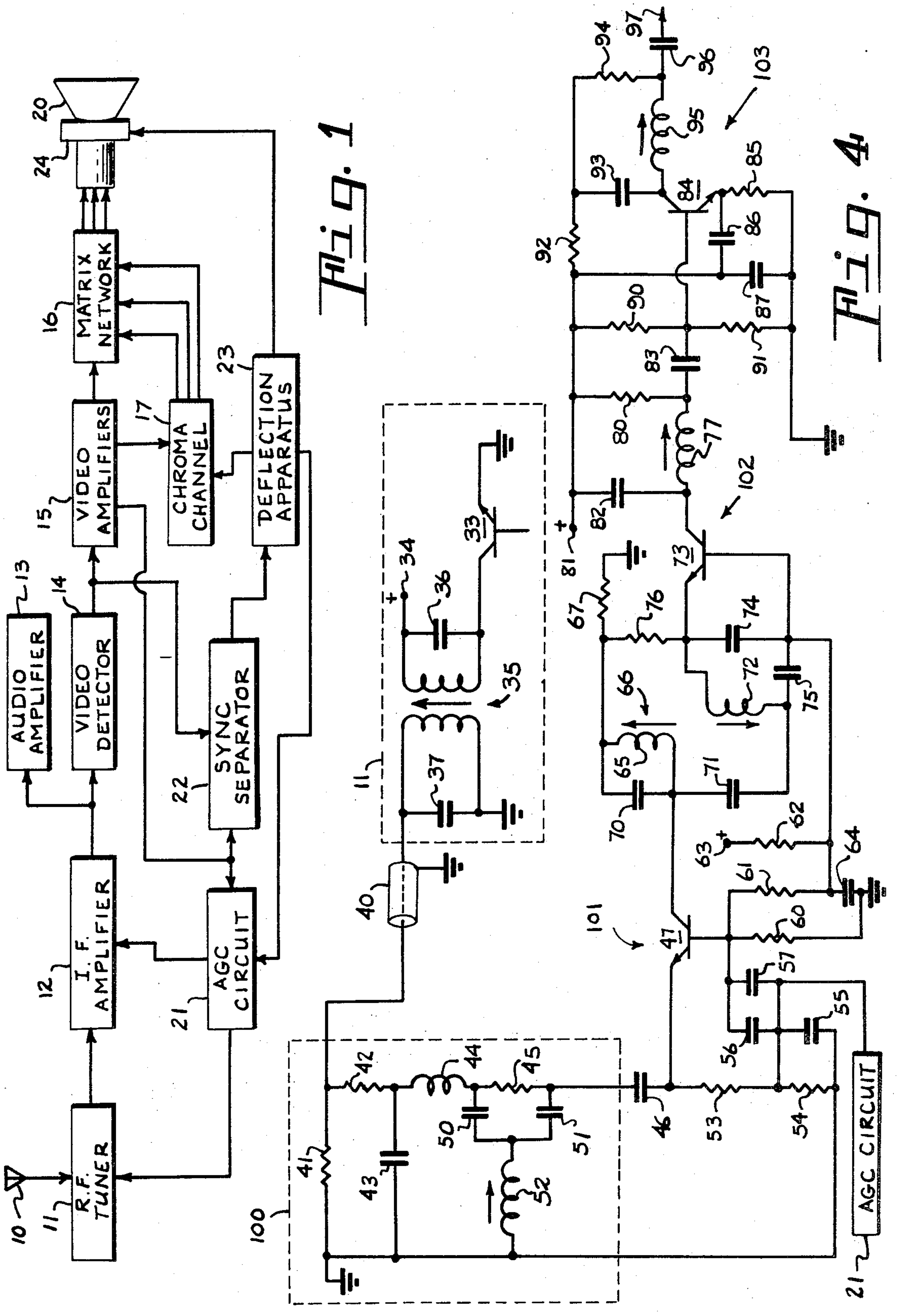
FIG. 1 is a block diagram of a typical television receiver which utilizes the invention.
FIG. 4 is a schematic diagram of a practical embodiment of an intermediate frequency amplifier utilizing the invention.

In FIG. 1 an antenna 10 is connected to a radio frequency (RF) tuner 11 which has an output connected to an intermediate frequency (IF) circuit or amplifier 12. IF amplifier 12 preferably has a plurality of stages with an output of the last stage connected to audio channel 13 and video detector 14. An output of video detector 14 is connected to video amplifiers 15 which has an output connected to matrix network 16. Another output of video amplifiers 15 is connected to chroma channel 17 which provides color difference signals R–Y, B–Y, and G–Y to matrix network 16. Matrix network 16 provides R, B, and G signals to a color display tube or picture tube 20.

Another output from video amplifiers 15 is connected to automatic gain control (AGC) means or circuit 21 and a sync separator 22. Sync separator 22 also receives an output signal from video detector 14 which is coupled to the usual noise gate. An output of sync separator 22 is coupled to a deflection circuit or apparatus 23 which has an output connected to a yoke 24 positioned about the neck of picture tube 20. Another output of deflection apparatus 23 is connected to chroma channel 17 for gating the burst amplifier therein and for blanking the chroma amplifier therein. Another output of deflection apparatus 23 is connected to AGC circuit 21 in accordance with the usual practice in keyed AGC. AGC circuit 21 provides a first output bias signal coupled to RF tuner 11 and a second output bias signal coupled to one or more stages of IF amplifier 12.

While the block diagram of FIG. 1 illustrates a color television receiver, this invention is also usable in monochrome television receivers as will be evident to those skilled in the art. The operation of a color television receiver is sufficiently well known to those skilled in the art that a detailed description of the operation of FIG. 1 will not be given.

Figure 2:
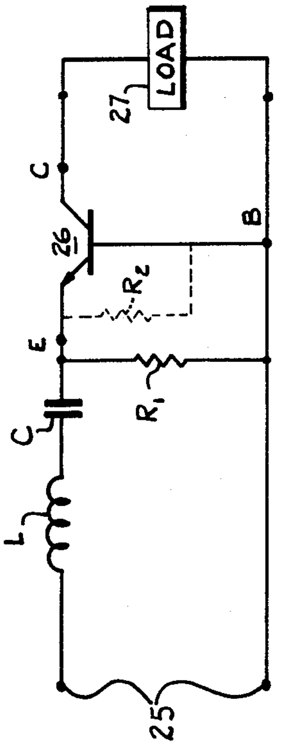
FIG. 2 is a simplified schematic diagram of one form of an amplifier with a series damped resonant circuit.

In FIG. 2 a series resonant circuit is illustrated with a transistor connected in a common base configuration to provide series damping of the resonant or tuned circuit. For simplicity, the DC bias components are omitted from the circuit. A series RLC circuit, consisting of an inductor L, a capacitor C, and a resistor $R_1$, is connected between input terminals 25. A transistor means, illustrated on an NPN transistor 26, has an emitter connected to one end of resistor $R_1$ and a base connected to the other end of resistor $R_1$. An exemplary load 27 is connected between a collector of transistor 26 and the junction of resistor $R_1$ and the base of transistor 26. Resistor $R_2$ is an exemplary impedance representative of the emitter-base resistance of transistor 26.

The $Q$ of a series $RLC$ circuit is $$Q=(\sqrt{L/C})/R=W_o/W_{bw} \quad (1)$$

where $W_o$ is the resonant frequency and $W_{bw}$ is the bandwidth or the frequency difference at the half power points of the frequency response characteristic. Equation (1) illustrates that $Q$ is inversely proportional to the bandwidth of the frequency response and to the damping resistance $R$, which may be approximately compared in the case of FIG. 2 to the parallel combination of resistor $R_1$ and the input resistance of transistor 26 as represented by resistor $R_2$.

In a transistor connected in a common base configuration the input impedance is inversely proportional to the $gm$ factor of the transistor. The $gm$ factor is not entirely resistive because $gm$ is proportional to the emitter current, but, as an approximation, the input resistance of transistor 26 is $1/gm$. Thus, the approximate resistance in parallel with resistor $R_1$ is $R_2 \approx 1/gm$. Also, the gain, G, of a common base transistor is approximately $gmR_L$ where $R_L$ is the load resistance connected to the collector of transistor 26. Thus, increasing the gain of transistor 26 means that gm must increase thereby decreasing the resistance shunting resistor $R_1$ and decreasing the damping of the resonant circuit, From equation (1) it is clear that increasing the gain of transistor 26 increases $Q$ and decreases the bandwidth, $W_{bw}$, of the series damped resonant circuit.

Figure 3:
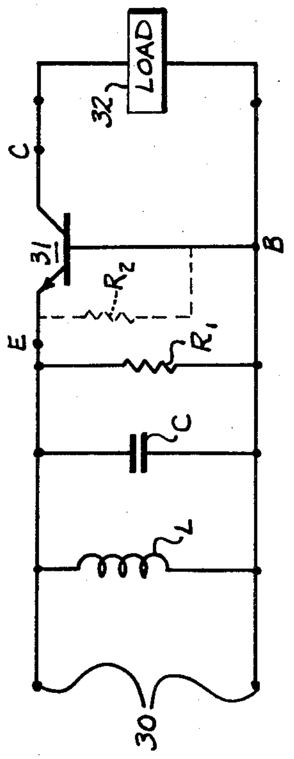
FIG. 3 is a simplified schematic diagram of an amplifier with a parallel damped resonant circuit.

In FIG. 3 a parallel resonant circuit is illustrated with a transistor connected in a common base configuration connected to provide parallel damping of the resonant or tuned circuit. A parallel $RLC$ circuit, consisting of an inductor L, a capacitor $C$, and a resistor $R_1$, is connected between input terminals 30. A transistor means, illustrated as an NPN transistor 31, has an emitter connected to one end of resistor $R_1$ and a base connected to the other end of resistor $R_1$. An exemplary load 32 is connected between a collector and the base of transistor 31. Resistor $R_2$ is an exemplary impedance representative of the emitter-base resistance of transistor 31.

The $Q$ of a parallel $RLC$ circuit is $$Q=R/(\sqrt{L/C})=W_o/W_{bw} \quad (2)$$

which illustrates that the $Q$ of a parallel damped $RLC$ circuit is proportional to the damping resistance, $R$. Thus, the bandwidth of the frequency response is inversely proportional to the damping resistance. In the circuit of FIG. 3 increasing the gain of transistor 31 means that gm must increase thereby decreasing the resistance shunting resistor $R_1$ and decreasing the damping of the resonant circuit. From equation (2), however, it is clear that increasing the gain of transistor 31 decreases the $Q$ of the parallel damped resonant circuit, and that bandwidth $W_{bw}$, increases.

From the description of FIGS. 2 and 3, it is clear that $Q$, and hence the bandwidth, of a resonant circuit can be either increased or decreased by varying the damping of the circuit. In a series damped circuit the $Q$ is increased and the bandwidth is decreased by decreasing the damping of the circuit. In a parallel damped circuit the $Q$ is decreased and the bandwidth is increased by decreasing the damping of the circuit. FIGS. 2 and 3 also illustrate how the damping can be decreased by increasing the gain of common base connected transistor. The principles described in connection with FIGS. 2 and 3 are utilized in a television receiver to vary or shape the frequency response of the IF amplifier circuitry to achieve the above objects.

FIG. 4 is a schematic circuit diagram of an intermediate frequency (IF) amplifier in accordance with the invention. A transistor 33 has its emitter connected to ground and its collector connected to a source of positive energizing potential illustrated as a terminal 34 by the primary winding of a tunable transformer 35. A capacitor 36 is connected in parallel with the primary winding of transformer 35. A secondary winding of transformer 35 is shunted by a capacitor 37 one end of which is connected to ground and the other end of which is connected to a conductor illustrated as a coaxial cable 40 with a grounded shield. Transistor 33, transformer 35, and capacitors 36 and 37 are illustrated as being the output stage of tuner 11.

Cable 40 is connected to a common conductor illustrated as ground by a resistor 41 in parallel with a series combination of a resistor 42 and a capacitor 43. The junction of resistor 42 and capacitor 43 is connected by an inductor 44 in series with a resistor 45 and a capacitor 46 to an emitter of a transistor means illustrated as an NPN transistor 47. Capacitors 50 and 51 are series connected and the combination is connected in parallel with resistor 45. A tunable inductor 52 is connected between the junction of capacitors 50 and 51 and ground. The emitter of transistor 47 is connected to ground by a series combination of resistors 53 and 54. A capacitor 55 is connected in parallel with resistor 54.

The output of AGC circuit 21 is connected to the junction of resistors 53 and 54 and by capacitors 56 and 57 in parallel to a base of transistor 47 for application of a gain control bias signal thereto. The base of transistor 47 is further connected by a resistor 60 to ground and by a resistor 61 in series with a resistor 62 to a source of positive energizing or bias potential illustrated as a terminal 63. The junction of resistors 61 and 62 is connected by a capacitor 64 to ground.

A collector of transistor 47 is connected to one end of a tunable primary winding 65 of a transformer 66, the other end of which is connected to ground by a resistor 67. A capacitor 70 is connected in parallel with primary winding 65. The collector of transistor 47 is further connected by a capacitor 71 to one end of a tunable secondary winding 72 of transformer 66, the other end of which is connected to an emitter of a transistor means illustrated as an NPN transistor 73. A base of transistor 73 is connected to the emitter thereof by a capacitor 74, to the junction of capacitor 71 and secondary winding 72 by a capacitor 75, and further to the junction of resistors 61 and 62. The emitter of transistor 73 is further connected by a resistor 76 to the junction between primary winding 65 and resistor 67.

A collector of transistor 73 is connected by a tunable inductor 77 in series with a resistor 80 to a source of positive energizing or bias potential illustrated as a terminal 81. The collector of transistor 73 is further connected to source 81 by a capacitor 82. The junction between inductor 77 and resistor 80 is connected by a capacitor 83 to a base of a transistor means illustrated as an NPN transistor 84.

Transistor 84 has an emitter connected by a resistor 85 to ground and by a capacitor 86 to source 81. Source 81 is further connected by a capacitor 87 to ground. The base of transistor 84 is connected by a resistor 90 to source 81 and by a resistor 91 to ground. Source 81 is further connected by a resistor 92 in series with a capacitor 93 to a collector of transistor 84. The junction between resistor 92 and capacitor 93 is connected by a resistor 94 in series with a tunable inductor 95 to the collector of transistor 84. The junction between resistor 94 and inductor 95 is connected by a capacitor 96 to an output terminal 97 which can comprise an output terminal of the IF amplifier or can be connected to additional stages of IF amplifier.

In operation, the RF tuner 11 heterodynes the received signal to IF wherein the video carrier is at 45.75 mHz and the audio carrier is at 41.25 mHz. The IF signal provided at the collector of transistor 33 is coupled to a filter 100 which includes a tunable trap that can be tuned by adjusting inductor 52. Ordinarily this trap is tuned to 47.25 mHz to reject the audio carrier of the adjacent channel. The signal from filter 100 is coupled by coupling capacitor 46 to amplifier stage 101 which includes transistor 47. Amplifier stage 101 is defined as including the resonant or tuned circuit, up to and including transformer 35, connected to the emitter of transistor 47. Another resonant circuit, illustrated as a doubly tuned circuit wherein both the primary and secondary windings 65 and 72 of transformer 66 are tunable, connects the collector of transistor 47 to the base-emitter circuit of transistor 73. Transistor 73, its associated bias circuitry, and the doubly tuned resonant circuit comprise an amplifier stage 102. Amplifier stage 102 is connected by coupling capacitor 83 to amplifier stage 103 which includes transistor 84 and its associated circuitry.

Figure 5:
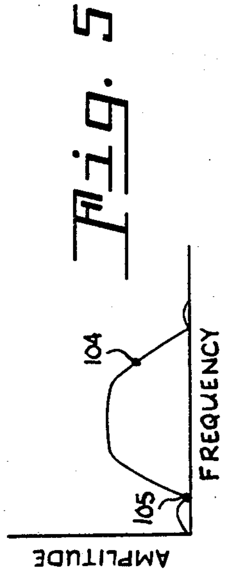
FIGS. 5, 6, 7, and 8 are frequency response curves to aid in explaining the operation of the invention.

FIG. 5 shows a typical IF response curve. The video carrier is at point 104 on the curve while the audio carrier is down the skirt on the opposite side at point 105. The IF response illustrated in FIG. 5 is the strong signal response when the gain of the IF amplifier is minimum. In accordance with reverse-bias AGC, as described in the above-referenced co-pending application, the AGC bias provided by AGC circuit 21 causes maximum gain reduction when a strong signal is received. As the received signal strength decreases, the AGC decreases thereby increasing the gain of the IF amplifier by increasing the base bias voltage to increase the collector and emitter currents of transistor 47. In FIG. 4 transistors 47 and 73 are connected in cascade (series) so that the collector current of transistor 47 is provided through transistor 73 via resistor 76 and winding 65. Thus, when the AGC bias voltage varies the bias of transistor 47 thereby varying its collector current, the emitter current of transistor 73 is likewise varied thereby also varying the gain of amplifier stage 102. Resistor 67 limits the effect of AGC on amplifier stage 102; that is, it divides the effect of the AGC bias between amplifier stages 101 and 102.

Capacitors 74 and 75 and winding 72 comprise a resonant or tuned circuit with a capacitance means and an inductance means. For this purpose windings 72 and 65 are defined as tunable inductances or inductors. The input impedance of transistor 73, together with resistor 67 and 76, provides a series damping for the tuned circuit as illustrated in FIG. 2. Capacitor 70 and winding 65 comprise another resonant or tuned circuit. Although this tuned circuit is not series damped in the most simplified sense, due to the nature of double tuned circuits of the type illustrated, varying the damping of one resonant portion causes the *Q* of both poles to either increase or decrease simultaneously the same as if both resonant portions of the doubly tuned circuit were series damped. Thus, amplifier stage 102 has a double tuned resonant circuit with transistor 73 providing damping for both portions of the circuit.

Figure 6:
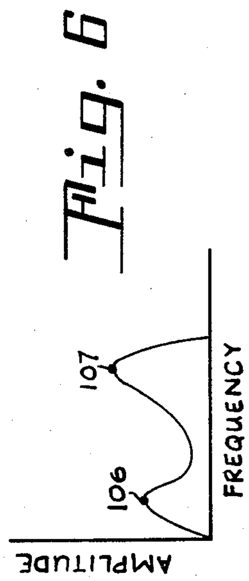

Referring to FIG. 6, there is shown a response curve for amplifier stage 102 obtained when the received signal strength is weak. When a weak signal is received, AGC circuit 21 causes the gain of amplifier stages 101 and 102 to increase. This means that the gm factor of transistor 73 increases thereby decreasing the input impedance of transistor 73 to decrease the damping of each portion of the double tuned resonant circuit. In a double tuned resonant circuit increasing the *Q* of one of the poles or peaks will increase the *Q* of both poles or peaks in the response. Thus, both the video and audio carriers will be raised or peaked relative to the response between the carriers, as is illustrated in FIG. 6, by tuning the double tuned circuit so that resonant frequencies occur at or near the video and audio carriers.

The resonant frequencies of the tuned circuit are also varied with changes in gain or amplifier stage 102. Considering winding 72 as an inductor with an inductance L, an analysis of the circuit including winding 72, transistor 73, and capacitors 74 and 75 shows that the resonant frequency shifts with gain. The approximate impedance of capacitor 74 in parallel with the input resistance of transistor 73 (approximated by $1/gm$) is $$Z_1 = 1/(gm+jWC_2) = (gm-jWC_2)/(gm^2+{}^2C_2^2) \qquad (3)$$

where $C_2$ is the capacitance of capacitor 74. This impedance is equivalent to a resistance $r'$ in series with a capacitance $C'$. That is, $$Z_1 = \frac{\text{gm.}}{\text{gm.}^2 + W^2C_2^2} - \frac{jWC_2}{\text{gm.}^2 + W^2C_2^2} \qquad (4)$$

where $$r' = \frac{\text{gm.}}{\text{gm.}^2 + W^2C_2^2} = \frac{1}{\text{gm.} + \frac{W^2C_2^2}{\text{gm.}}} \qquad (5)$$

and $$C' = \frac{\text{gm.}^2 + W^2C_2^2}{W^2C_2} = \frac{\text{gm.}^2}{W^2C_2} + C_2 \qquad (6)$$

The resonant frequency of the circuit (ignoring the effect of the mutual inductance due to the coupling through transformer 66) is $$W_O = 1/(\sqrt{LC_t}), \quad (7)$$

where $$C_t = (C_1 C')/(C_1 + C') \quad (8)$$

and $C_1$ is the capacitance of capacitor 75, because capacitor 75 is effectively in series with capacitance $C'$. Equations (6), (7), and (8) show that an increase in gain ($gm$) increases $C'$ which also increases $C_t$ thereby decreasing the resonant frequency $W_O$. Thus, placing capacitor 74 in parallel with the input impedance of transistor 73 has the effect of decreasing both of the resonant frequencies of the double tuned circuit with increasing gain. To cause a shift of the poles or resonant frequencies in the opposite direction capacitor 74 can be replaced by a suitable inductor.

Thus, amplifier stage 102 controls both the change of the response shape ($Q$) and the change of the frequency of resonance with gain. The frequency response peaks at the resonant frequencies or poles because the decrease in input impedance of transistor 73 with increasing gain increases the $Q$ of the frequency response at both poles thereby decreasing the bandwidth of the frequency response. In one practical embodiment of amplifier stage 102 the resonant frequencies of the double tuned circuit were between 46 mHz and 46.5 mHz and at about 42 mHz for minimum gain and at about 45.9 mHz and 41 mHz for maximum gain. Thus, the peaking of the frequency response at the video and audio carrier frequencies results from both an increase in $Q$ and a shift of the resonant frequencies closer to the carriers. Since the frequency response peaks at the audio and video carrier frequencies, the best response is obtained by the viewer without detuning the receiver.

Figure 7:
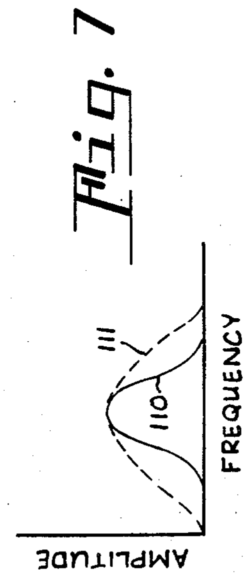

FIG. 7 illustrates the effect of decreasing the $Q$ of a parallel damped resonant or tuned circuit as was explained with FIG. 3. In FIG. 4 the secondary winding of transformer 35 operates as a tunable inductance or inductor in a resonant or tuned circuit including capacitors 37 and 43 which also includes damping resistor 53. For this purpose capacitors 55, 56, and 57 operate as a-c bypass capacitors. Transistor 47 provides parallel damping of the resonant circuit. When a strong signal is received, the bandwidth of the frequency response of amplifier stage 101 is narrow as is illustrated by curve 110 in FIG. 7. When the gain of amplifier stage 101 is increased, the bandwidth of the resonant circuit increases ($Q$ decreases) as is illustrated by dashed line curve 111. Preferably a pole or resonant frequency due to the resonant circuit of amplifier stage 101 is between the two resonant frequencies due to the two portions of the resonant circuit of amplifier stage 102. Thus, increasing the bandwidth of the resonant circuit of stage 101 has the effect of raising the response at the audio and video carriers with respect to the response at the resonant (pole) frequency thereby increasing the audio and video carriers with respect to the response intermediate the carriers.

Figure 8:
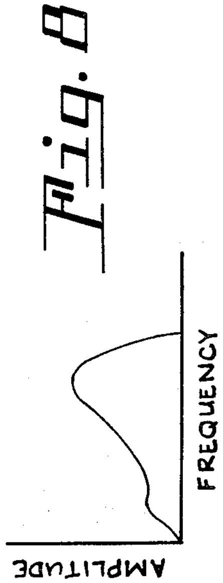

FIG. 8 illustrates the overall response of the IF amplifier in response to weak received signals. FIG. 8 is the combination of the response curve of FIGS. 6 and 7 together with the response of amplifier stage 103 which is a typical single pole response similar to that illustrated by curve 110 of FIG. 7.

In one practical embodiment of this invention, the above-noted objects and advantages were obtained in a circuit wherein the resistance change of the input impedances of transistors 47 and 73 was from over 1,000 ohms for low gain to approximately 8 ohms for high gain.

The circuit of FIG. 4 thus causes the frequency response to increase at the video and audio carrier frequencies. The peaking at the video carrier frequency increases the apparent energy content of the picture while reducing the overall noise energy because most of the picture energy is transmitted in the low frequency spectrum near the video carrier. Thus, the result is an apparent improvement of signal to noise ratio. The increase or peaking at the audio carrier increases the signal to noise ratio of the audio signal thereby resulting in improved weak signal sound. Also, since the response between the audio and video carrier is reduced, audio intermodulation noise is reduced. Reducing the response at the chrominance signal subcarrier, which is between the audio and video carriers, tends to reduce objectionable color noise. In addition, the best weak signal performance of the receiver is obtained without detuning the receiver. In prior art receivers the weak signal performance was apparently improved if the receiver was detuned such that the video carrier was shifted to the peak of the response characteristic. With this invention the maximum gain of the receiver will be obtained at correct fine tuning of the receiver. Thus, the traps and other circuitry will perform its intended function.

While there have been shown and described what are at present considered the preferred embodiments of the invention, it will be obvious to those skilled in the art that various changes and modifications may be made therein without departing from the scope of the invention as defined by the appended claims.

I claim:

1. In a television receiver having radio frequency, intermediate frequency, audio, video, synchronizing and control circuitry wherein said control circuitry includes an automatic gain control circuit, improved intermediate frequency circuitry comprising:

an amplifier stage including a transistor means having an input means and connected in a common base configuration and a resonant circuit connected to said input means of said transistor means, said resonant circuit including inductance means and capacitance means and the input impedance of said transistor means providing series damping of said resonant circuit; and means connecting said automatic gain control circuit to said amplifier stage for varying the input impedance of said transistor means in accordance with an automatic gain control bias signal from said automatic gain control circuit for decreasing the frequency response bandwidth and peaking the portion of the frequency response including the video carrier intermediate frequency when the gain of said amplifier stage is increased relative to the frequency response when the gain of said amplifier stage is at a minimum.

2. Intermediate frequency circuitry as defined in claim 1 wherein said resonant circuit includes a capacitance means connected in parallel with said input means of said transistor means whereby the resonant frequency of said resonant circuit varies in response to variations of the input impedance of said transistor means.

3. Intermediate frequency circuitry as defined in claim 1 wherein said resonant circuit is doubly tuned with a first resonant frequency at the video carrier intermediate frequency when the gain of said amplifier stage is maximum and a second resonant frequency at the audio carrier intermediate frequency, the frequency response bandwidth of each peak of said resonant circuit being decreased in response to the automatic gain control bias signal.

4. Intermediate frequency circuitry as defined in claim 1 including: a second amplifier stage including a second transistor means and a second resonant circuit including an inductance means and a capacitive means connected to said second transistor means, the input impedance of said second transistor means providing parallel damping of said second resonant circuit; and means connecting said automatic gain control circuit to said second amplifier stage for varying the input impedance of said second transistor means in accordance with the automatic gain control bias signal to increase the frequency response bandwidth of said second amplifier stage with increasing gain.

5. Intermediate frequency circuitry as defined in claim 3 including: a second amplifier stage including a second transistor means and a second resonant circuit including an inductive means and a capacitive means connected to said second transistor means, the input impedance of said second transistor means providing parallel damping of said second resonant circuit; and means connecting said automatic gain control circuit to said second amplifier stage for varying the input impedance of said second transistor means in accordance with the automatic gain control bias signal to increase the frequency response bandwidth of said second amplifier stage with increasing gain.

6. Intermediate frequency circuitry as defined in claim 5 wherein said first-named transistor means and said second transistor means are connected in cascade.

7. Intermediate frequency circuitry as defined in claim 5 wherein said second amplifier stage has a resonant frequency at a frequency intermediate the frequencies of said first and second resonant frequencies of said first-named amplifier stage.

8. In a television receiver an intermediate frequency amplifier comprising:

an amplifier stage having a tuned circuit including an inductance means and a capacitance means and a transistor biased as a common base amplifier connected to said tuned circuit whereby the input impedance of said transistor provides series damping of said tuned circuit; and an automatic gain control means for providing an automatic gain control bias signal to said amplifier stage for varying the bias of said transistor in accordance with the strength of the signal being amplified and further varying the input impedance of said transistor to thereby vary the damping of said tuned circuit and the bandwidth of the frequency response of said amplifier stage by peaking the frequency response at the intermediate frequency of the video carrier to increase the amplitude of the video signal in the frequency spectrum near the video carrier relative to the amplitude of the video signal in the remaining portion of the intermediate frequency spectrum when the gain of said transistor is increased by said automatic gain control bias signal.

9. An amplifier as defined in claim 8 wherein said tuned circuit is doubly tuned with a first resonant frequency approximately at the video carrier intermediate frequency and a second resonant frequency approximately at the audio carrier intermediate frequency, the frequency response bandwidth of each peak of said tuned circuit decreasing in response to decreased input impedance of said transistor.

10. An amplifier as defined in claim 8 including: a second amplifier stage having a second tuned circuit and a second transistor biased as a common base amplifier connected to said second tuned circuit whereby the input impedance of said second transistor damps said second tuned circuit; and means connecting said second amplifier stage to said automatic gain control means for varying the bias of said second transistor in accordance with the strength of the signal being amplified and further varying the input impedance of said second transistor to thereby vary the damping of said second tuned circuit and the bandwidth of the frequency response of said second amplifier stage.

11. An amplifier as defined in claim 10 wherein said first-named tuned circuit is doubly tuned with a first resonant frequency at the video carrier intermediate frequency and a second resonant frequency at the audio carrier intermediate frequency when the gain of said first-named amplifier stage is maximum, the frequency response bandwidth of each peak of said first-named tuned circuit decreasing in response to decreased input impedance of said first-named transistor, and said second tuned circuit has a resonant frequency at a frequency intermediate the frequency of said first and second resonant frequencies of said first-named tuned circuit.

12. An amplifier as defined in claim 10 wherein said first-named tuned circuit is series damped and said second tuned circuit is parallel damped.

13. An amplifier as defined in claim 10 wherein said first-named transistor and said second transistor are connected in cascade.

* * * * *

PO-1050
(5/69)

UNITED STATES PATENT OFFICE
CERTIFICATE OF CORRECTION

Patent No. 3,706,846 Dated December 19, 1972

Inventor(s) Karol Siwko

It is certified that error appears in the above-identified patent and that said Letters Patent are hereby corrected as shown below:

Col. 6, line 22 per patent - "double" should read "doubly"

Col. 6 line 51 per patent - "$(gm^2 + {}^2C_2{}^2)$ should read "$(gm^2 + W^2C_2{}^2)$ Signed and sealed this 15th day of May 1973.

(SEAL)
Attest:

EDWARD M.FLETCHER,JR.
Attesting Officer

ROBERT GOTTSCHALK
Commissioner of Patents